United States Patent [19]

Drexler

[11] Patent Number: 5,681,082

[45] Date of Patent: Oct. 28, 1997

[54] INFANT SEAT WITH MULTIPLE RESTING POSITIONS

[75] Inventor: Joannes Herman Drexler, Doesburg, Netherlands

[73] Assignee: B.V. Machine-en Metaalwarenfabriek Dremefa, Netherlands

[21] Appl. No.: 545,730

[22] PCT Filed: May 10, 1994

[86] PCT No.: PCT/NL94/00104

§ 371 Date: Nov. 6, 1995

§ 102(e) Date: Nov. 6, 1995

[87] PCT Pub. No.: WO94/26152

PCT Pub. Date: Nov. 24, 1994

[30] Foreign Application Priority Data

May 10, 1993 [NL] Netherlands ............. 9300803

[51] Int. Cl.⁶ .................................. A47C 1/029
[52] U.S. Cl. .............. 297/256.1; 297/131; 297/270.5
[58] Field of Search .................. 297/130, 131, 297/270.1, 270.2, 270.3, 270.5, 256.1

[56] References Cited

FOREIGN PATENT DOCUMENTS 0218444  4/1987  European Pat. Off. ......... A47D 1/08

*Primary Examiner*—Peter M. Cuomo
*Assistant Examiner*—Stephen Vu
*Attorney, Agent, or Firm*—Michael D. Bednarek; Kilpatrick Stockton LLP

[57] ABSTRACT

An infant seat having a portable bucket seat body including a rocker bottom. An auxiliary support is pivotably mounted on the rocker bottom, such that the auxiliary support can swing between an inoperative and an operative position. In the inoperative position, the auxiliary support swings up generally in the plane of the rocker bottom. In the operative position, the auxiliary support swings down and locks into a position that causes the infant seat to tilt more forwardly.

5 Claims, 2 Drawing Sheets

INFANT SEAT WITH MULTIPLE RESTING POSITIONS

FIELD OF THE INVENTION

The invention relates to an infant seat, as defined in the first part of claim 1.

When placed on a flat support surface—with the auxiliary support in its inoperative position—such a seat may roll with its curved bottom on the support surface and thus perform a rocking motion about a substantially lying mid position. Moving the auxiliary support towards its operative position brings the seat in a rather upright position, in which it is supported in a stable manner—with the forward part of the bottom and the rear free end of the auxiliary support resting on the support surface.

DESCRIPTION OF RELATED ART

In a well-known embodiment the auxiliary support is formed by a substantially U-shaped member that is slidably movable in its plane from a forward retracted position rearwardly into an extended position. Pulling the auxiliary support into the extended position and pushing it back into the forward retracted position respectively is rather difficult and causes inconvenience to the child in the seat. For the seat has to be tilted forwardly for seizing the auxiliary support under the bottom.

The invention aims at removing this drawback of the well-known seat.

SUMMARY OF THE INVENTION

In accordance with the invention this aim is achieved in that the U-shaped auxiliary support is mounted with the free ends of its legs about a transverse axis for a downward swinging movement, said axis being located adjacent the centre of the rocking bottom, a locking device being provided, adapted to be actuated at the top behind the backwall of the bucket-shaped seat to lock the auxiliary support in its active and inactive positions.

With an infant seat performed in accordance with the present invention, the seat needs to be lifted at its backside only to a small extent—corresponding with the desired more upward and stable sitting position—from the support surface to cause the auxiliary support to swing down into its operative position. The lifting of the seat and the unlocking of the auxiliary support may take place in one single action.

It is to be noted that EP-A-0218444 discloses an infant seat, comprising a bucket seat body with two sidewalls, a bottom, a seat and an inclined backwall and a pivotally connected carrying handle, with which there is also an auxiliary support that is pivotally mounted about a transverse axis. In this case the transverse axis is located at the rearward end of the bottom of the seat which bottom extends—as seen in the rearward direction—only slightly beyond the position of the transverse swinging axis of the carrying handle and, as a consequence of this, does not by itself constitute a rocker bottom. When it is desired to rock the seat body on a supporting surface, the platform-like auxiliary support has to be set in a position in which it constitutes a rearward and curved extension of the seat bottom.

DESCRIPTION OF THE PREFERRED EMBODIMENTS

Figure 1:
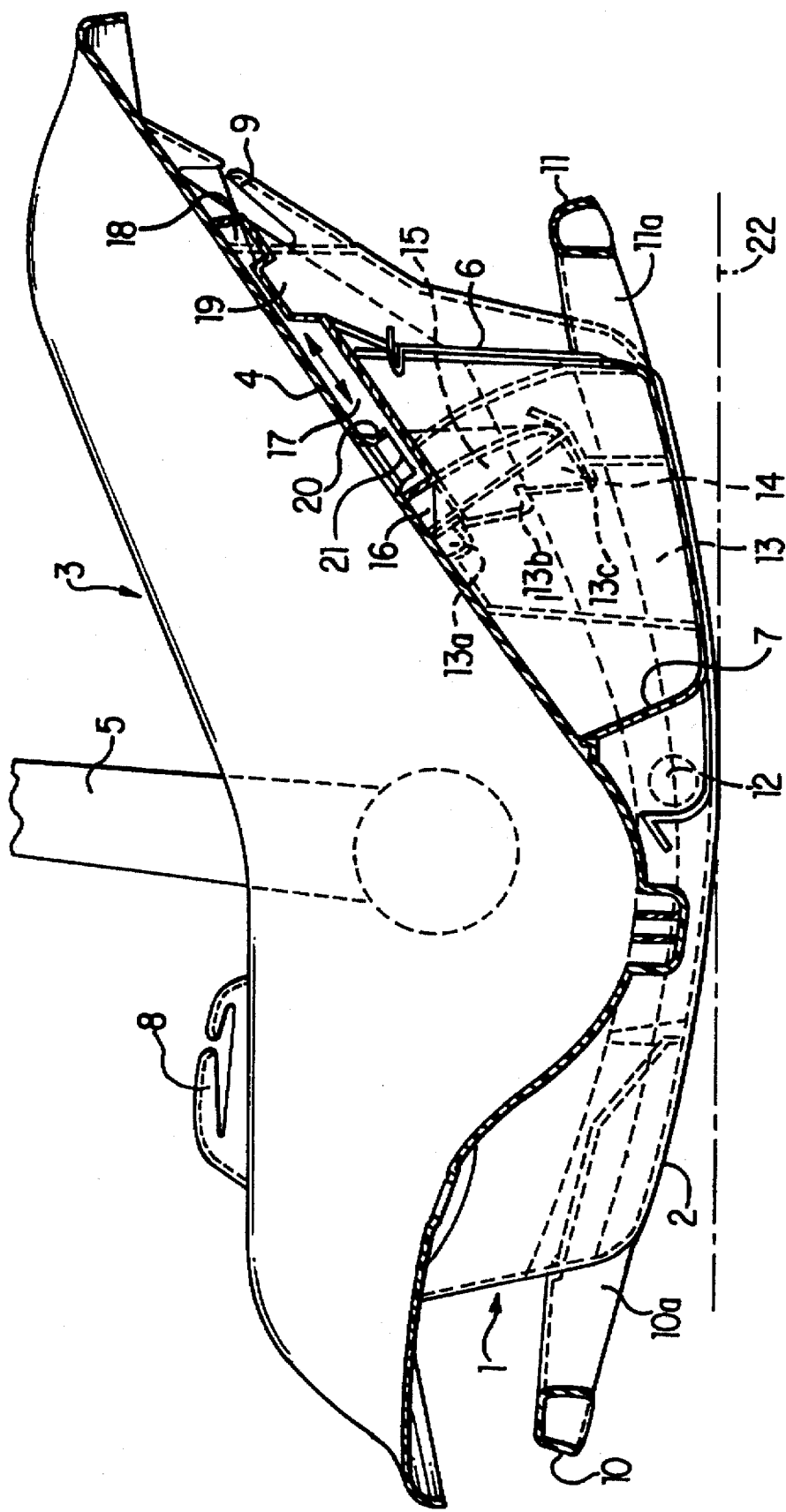

The invention will be hereinafter further explained by way of example with reference to the drawing.

Figure 2:
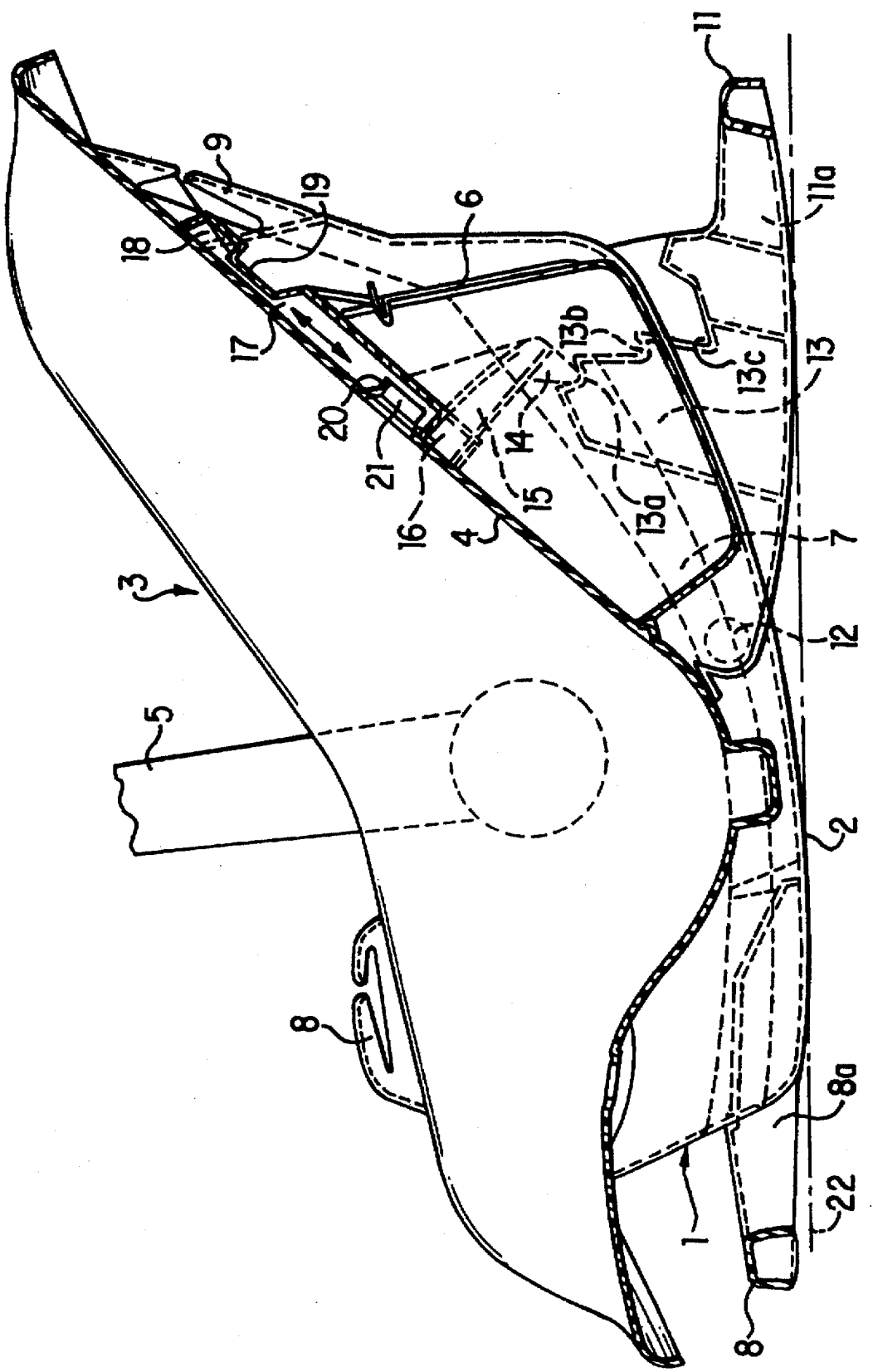

FIG. 1 is an elevational view, partially in longitudinal section, or the infant seat according to the invention, with the rearward auxiliary support in the lowered position and FIG. 2 is a side view similar to that of FIG. 1, but with the rearward auxiliary support in the lowered position.

The infant seat shown in the drawing comprises a bucket-shaped seat body with a lower support portion 1 having a curved bottom 2, and a seat portion 3 provided with an inclined beck wall 4. The lower support portion 1 comprises, in a well-known manner, two transversely spaced sidewalls, which are formed by two lateral downwardly directed bulges of the seating portion 3.

Under the backwall 4, between the two sidewalls of the support portion 1, a storage space 7 is formed, which is accessible through a rearward cover 6.

5 designated a part of a carrying handle, the ends of which are pivotally connected on the outer side of the bucket-shaped seat body. This carrying handle does not make part of the present invention and may be of a well-known type; it will therefore not be described in further detail. The handle 5 may swung downwardly from the operative (not shown). While the carrying handle is swung down the seat is supported, through the two sidewalls of the lower support portion 1—on a floor, a seat of an automobile or a similar lying support surface. For fastening the infant seat on a seat or chair of an automobile attachment points 8 and 9 for a safety belt are provided.

The curved shape of the bottom 2 of the support portion 1 enables the seat—when placed on a floor or similar flat support surface—to rock about a transverse action and also contributes to a stable position on the often slightly concavely profiled passenger's seat.

In a lower position on the front side of the support portion 1 a gripping support 10 is provided and on the rear side a gripping or auxiliary support 11 is provided. The two supports 10 and 11 are each formed as a U-shaped handle. The legs 10a of the forward support 10 are, along a part of the respective leg lengths fixedly locked in place within the lower support portion 1 (between the two sidewalls of it,) whereas the legs 11a of the rear support 11 are pivotally mounted at 12 about a transverse action within the spaces between the two sidewalls of the support portion 1 and the storing compartment 7.

The support 11 is movable between a lifted position according to FIG. 1 and a lowered position according to FIG. 2 and may be locked in both of these positions, as well as in an intermediate position. For this purpose the legs 11a of the handle 11 are each provided on the upper side with an upwardly directed projection 13. Three locking seats 13a, 13b and 13c are provided on the rearwardly directing upstanding edge of said projection. The locking seats 13a–13c on each handle leg 11a may selectively cooperate with a locking projection 14. The two locking projections 14 are each provided on the lower end of an arm 15 that extends downwardly along the inner side of a sidewall of the support portion 1. The arms 15 have their upper ends fixed to a transversely extending connecting portion 16, that forms the cross piece of a T, the central leg 17 of which is movably mounted (in the arrow direction) in a guide means (not indicated) formed under the backwall 5 and located in the vertical plane of symmetry of the seat. The leg 17 has at its (upper) free end a knob 18 with a recess 19 located there behind and is normally urged into its lower locking position by means of a spring device 21 that is supported by a downwardly bent lip 21 of the backwall 4. The parts 14–21 together form a sliding lock which may be operated by means of the knob 18.

In FIG. 1, with the rearward handle 11 in its upper position, the seat is supported in a substantially lying position with the curved bottom 2 on the horizontal supporting surface 22. By using one of the handles 10 and 11 respectively as a foot pedal it is easy to have the seat perform a rocking motion.

In the position shown in FIG. 1 the locking projections 14 are held, by means of the spring device 21, into engagement with the lower locking seats 13c of the respective projections 13 on the two handle legs 11a.

When it is desired to place the seat in a more upright position, the handle 11 may be easily swung downwardly by slightly lifting the seat on the rear side—with one hand engaging the upper edge of the backwall 4—and sliding the lock 14–19, by means of the thumb of the same hand, upwardly against the action of the spring device 21. This releases the locking projections 14 from their seats 13c, so that the handle 11 is permitted to swing downwards. Thereupon, while the seat is kept in the desired position, release of the lock allows the locking projections 14 to engage e.g. the upper locking seats 13a, so that the situation of FIG. 2 is obtained, in which the seat is supported in a stable sitting position on the supporting surface 22.

What is claimed is:

1. A portable and rockable infant seat comprising:

an integrally formed infant receiving and supporting body having a seat portion, an inclined back rest portion, and two opposite side walls on either side of said seat portion and said back rest portion, said side walls having corresponding lowermost edges that are curved along their length, whereby said infant receiving and supporting body is supported in a rocking manner;

a carrying handle for carrying the infant receiving and supporting body, said carrying handle having elongated first leg portions, each said elongated first leg portion being rotatably and lockably mounted to a respective said opposite side wall, whereby said handle is rotatable about a first transverse axis;

a auxiliary support having second leg portions and a cross-piece interconnecting said second leg portions at one end of each said second leg portion, said auxiliary support being rotatably mounted about a second transverse axis positioned under said first transverse axis and adjacent said lowermost edges of said side walls, wherein said auxiliary support is constructed and arranged to be movable between an inoperative position in which said auxiliary support is positioned with said second leg portions being substantially against a rocking plane defined by said lowermost edges, and at least one operative position in which said auxiliary support extends with said second leg portions extending rearwardly and downwardly relative to said infant receiving and supporting body so as to maintain said infant receiving and supporting body in a non-rocking condition;

first locking means carried by said auxiliary support means for locking said auxiliary support means into a fixed position; and second locking means mounted on a backside of said back rest portion for allowing said first locking means to selectively enter into engagement with said second locking means in positions corresponding with said operative and inoperative positions of said auxiliary support means; and further comprising a first locking projection, and a second locking projection complementary to said first locking projection, said first locking projection extending upwardly from an upper side of said second leg portions, said first locking projection being adapted to engage, in at least two selective positions corresponding with said inoperative and operative positions of said auxiliary support respectively, said second complementary locking projection provided on a sliding lock that is reciprocatingly guided in the plane of symmetry of the seat, along the lower side of said back rest portion.

2. An infant seat according to claim 1, wherein said second transverse axis of said auxiliary support is positioned adjacent a center of the bottom of said infant receiving and supporting body.

3. An infant seat according to claim 2, wherein said locking projection on said first leg portions of said handle is provided with at least two locking seats adapted to selectively engage said second complementary locking projection on said sliding lock.

4. An infant seat according to claim 3, wherein said second complementary locking projections are each connected to said sliding lock by means of a cross piece and an arm suspending from an end of said cross piece.

5. An infant seat according to claim 4, characterized in that the sliding lock is constructed and arranged to be movable into an unlocked position against a spring action.

* * * * *